N. D. LEVIN.
ELECTRIC LOCOMOTIVE WITH CABLE REELING MECHANISM.
APPLICATION FILED JULY 14, 1909. RENEWED APR. 11, 1914.

1,136,246.

Patented Apr. 20, 1915.
2 SHEETS—SHEET 1.

Witnesses

Inventor
Nils D. Levin
By H. H. Bliss
Attorney

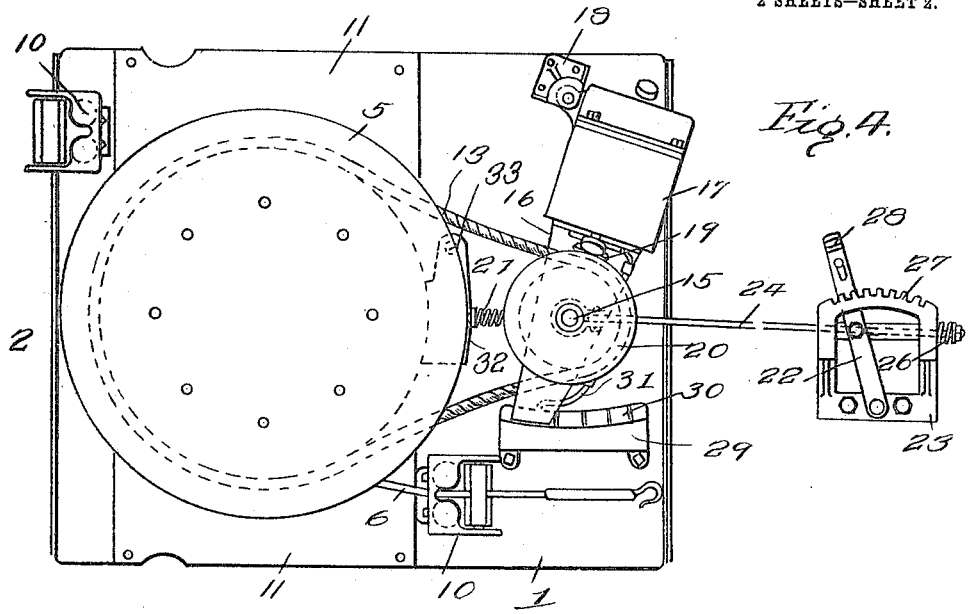
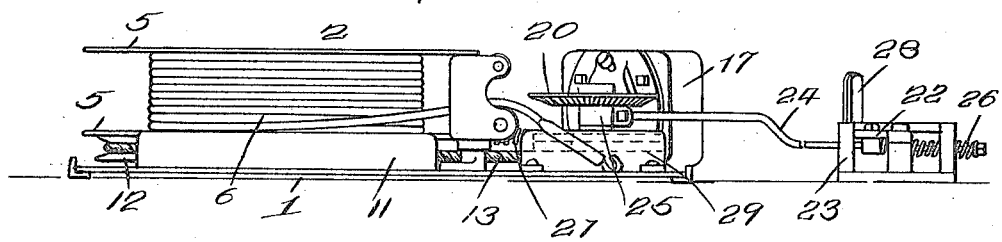
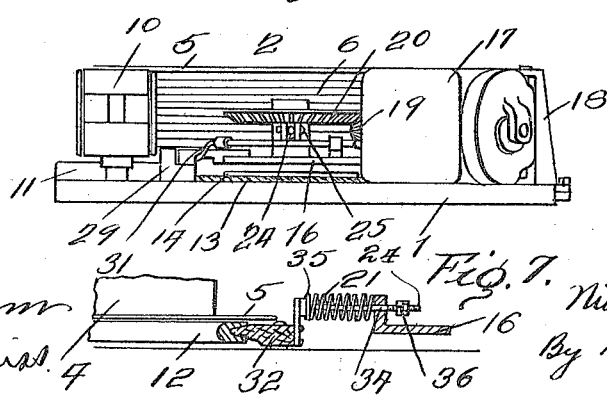

UNITED STATES PATENT OFFICE.

NILS D. LEVIN, OF COLUMBUS, OHIO, ASSIGNOR TO THE JEFFREY MANUFACTURING COMPANY, A CORPORATION OF OHIO.

ELECTRIC LOCOMOTIVE WITH CABLE-REELING MECHANISM.

1,136,246.   Specification of Letters Patent.   Patented Apr. 20, 1915.

Application filed July 14, 1909, Serial No. 507,635. Renewed April 11, 1914. Serial No. 831,342.

*To all whom it may concern:*

Be it known that I, NILS D. LEVIN, a citizen of the United States, residing at Columbus, in the county of Franklin and State of Ohio, have invented certain new and useful Improvements in Electric Locomotives with Cable-Reeling Mechanism, of which the following is a specification, reference being had therein to the accompanying drawing.

This invention relates to cable reeling mechanisms, and has as its object to provide an improved means for applying the power necessary for winding a cable reel and for controlling the application of the power and the winding and unwinding of the reel.

In the accompanying drawings I have shown the embodiment of my invention which I now deem preferable. Various changes may, however, be made if desired.

Figure 1:
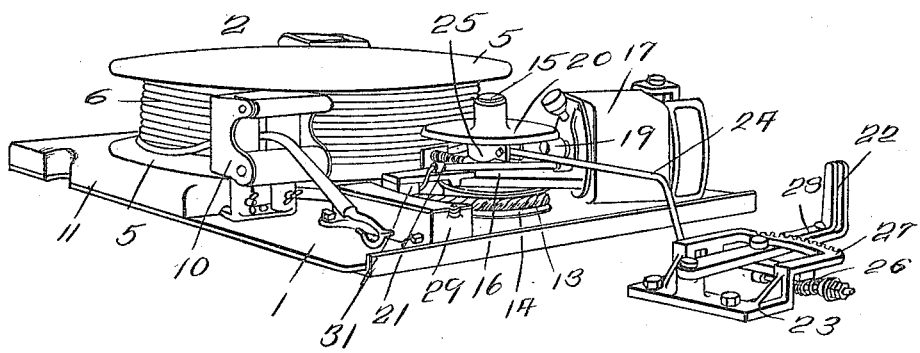
Figure 2:
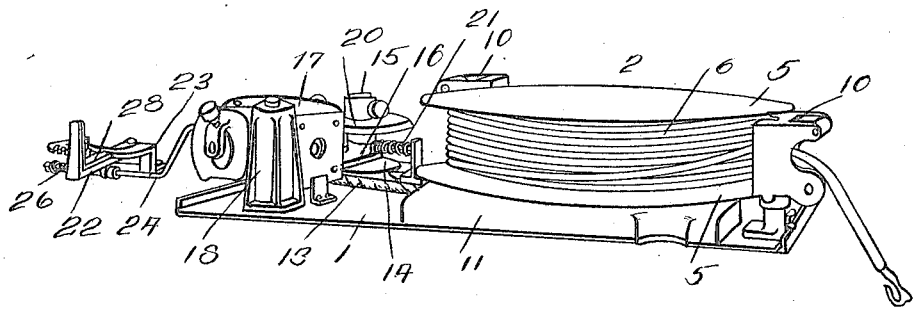
Figure 3:
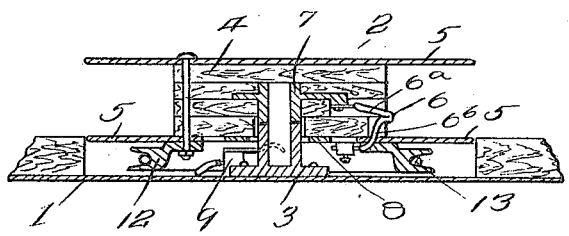

Of the drawings—Figure 1 is a perspective view of a cable reeling apparatus and controlling mechanism therefor, constructed in accordance with my invention. Fig. 2 is another perspective view of the same taken from another point. Fig. 3 is a vertical section of the reel. Fig. 4 is a plan view of the entire apparatus. Fig. 5 is a side elevation. Fig. 6 is an end elevation with the controlling lever removed. Fig. 7 is a view partly in cross section and partly in elevation of the brake mechanism.

Numeral 1 designates a base plate which is intended to be secured to suitable parts of an electric locomotive, or other moving object, to be supplied with electric current by means of the cable. It is to be understood, however, that the invention, as concerns some of its features, is not restricted to cable winding machines designed for use only with electric conductor cables, but is equally applicable to such machines for use with haulage and hoisting cables and chains.

The reel 2 is revolubly mounted in a standard 3 which is secured to the base plate 1 and is arranged with its axis in a vertical position, although this, of course, is immaterial to the principle of my invention. The reel may be constructed in any suitable manner, and as shown in the drawings, it consists of the wooden drum 4 and the metallic end plates 5, 5, which serve to retain the cable laterally. The cable 6 is wound upon the drum and is shown in the drawings as having contained within it two conductors $6^a$ and $6^b$, the inner end of one of which is electrically connected to the metallic hub 7 of the reel, and thus grounded, and the inner end of the other of which is electrically connected to the collecting ring 8 which engages with the brush 9. From the brush 9 current is led to the motor 17 for driving the reel and to the motors E, E for driving the locomotive.

Suitable guides 10, 10 are provided at opposite points near the reel periphery whereby the cable may be furnished an antifriction support as it leaves the reel, and prevent it from being worn against the stationary parts of the mechanism. The oppositely arranged guides 10, 10 make it possible for the cable to be wound onto or unwound from the reel at either side thereof. The guard plates 11, 11 are mounted upon the base plate 1 in such position that their upper faces are flush with the inner face of the lower reel flange 5, and in close proximity to the periphery of this flange. These guards prevent the cable from fouling under the reel.

The rope sheave 12 is rigidly secured to the under side of the reel and is engaged by the endless rope 13 which also passes around the rope sheave 14. This latter sheave 14 is mounted upon a vertical shaft 15 which is supported in bearings carried by the horizontal frame or carrier 16. This frame comprises arms which are bolted to the frame or casing of the motor 17 for driving the reel. The motor frame is mounted to turn about a vertical pivot pin mounted in a stationary bearing 18. On account of this pivotal mounting, the motor frame 17 and the sheave 14 are movable bodily about a vertical axis, and the sheave 14 can be caused to approach or recede from the reel sheave 12. The sheave 14 is connected to the motor by means of a pinion 19 on the armature shaft of the motor and a bevel gear 20 keyed to the shaft 15 upon which the sheave 14 is also rigidly mounted.

In order to control the movement of the carrier 16 and the motor and other parts connected to it, I provide a pivoted hand lever 22 which can be locked in any one of a plurality of positions by means of a dog 28 which may engage a segmental rack 27. Between the lever 22 and the frame 16 is a link 24. The link 24 is secured at one end to a sleeve 25 which engages the shaft 15. The other end of the link 24 has a yieldable connection through the spring 26 with the hand lever. It will be noted that by adjusting the position of the hand lever the carrier 16 and the sheave 20 may be yieldingly held in any desired position to properly tension the rope belt 13.

The reel is braked by means of the block 32 which is pivoted to the base plate at 33, and which engages with the rope receiving groove of the sheave 12 at a point adjacent the sheave 14. The block 32 is caused to bear against the sheave 12 by the plunger 34 which is slidably mounted in the frame 16 extending from the motor. This plunger is held in its outermost position by means of the spring 21 which bears at one end against the collar 35 at the outer end of the plunger, and at the other end against the frame 16. The nut 36 prevents the plunger from being entirely removed from its support in the frame 16. When the motor and the frame 16 rigidly secured thereto are swung about the pivot 18 and toward the reel, the plunger 34 engages the brake block 32 which is thereby yieldingly forced against the sheave 12.

Upon the box 29 are mounted one or more stationary contacts 30. A movable contact 31 is mounted upon the outer end of the carrier 16 and is adapted to engage with the stationary contacts 30 as the motor casing and frame 16 are swung about the vertical pivot at 18. The contacts 30 are arranged on the arc of a circle about the axis of the pivotal connection of the motor casing with the bed plate so that the movable contact 31 may properly register with each of them. It will be readily understood that by moving the lever 22 away from the reel, electrical connection will be established through the motor to start it, and the rope belt 13 will be simultaneously tightened. The apparatus is so adjusted that the motor acquires considerable velocity before the rope becomes tight enough to drive the reel. When, by means of the lever 28, the current is shut off and the grip of the rope 13 is loosened, the brake 32 is simultaneously applied, and by means of the same lever. When the current is turned on and the rope clutch thrown into operation, the brake is simultaneously released. It will be understood that the rope driving means which I have provided serves as a simple, efficient and cheap friction device for transmitting a rotative force to the reel.

In operation it is desirable that the cable be maintained at a substantially uniform tension during winding, and in order that this may be done the drive sheave 20 may be operated at a speed somewhat in excess of that corresponding to the speed of travel of the vehicle or locomotive. When this is done, the tendency is for the reel to rotate at a speed somewhat greater than is permitted by the cable. As a result, it is necessary for slippage to take place, and this occurs between the rope and one or both of the sheaves. It will be seen that the cable tension must at all times be in proportion to the resistance to slippage offered at the sheaves; and this resistance can be varied by adjusting the tension in the rope in the manner before described.

Obviously, many changes can be made in the details of the construction, as, for instance, in the mounting of the reel, in the form of the power means for driving the sheave 20, in the means for tightening the rope, in the means for applying the brake, etc. Changes in these and other respects are not considered to be departures from the invention as set forth in the following claims.

I do not herein claim the cable reeling mechanism and the driving devices therefor in combination with the frame and other parts of the locomotive in combination with which they are adapted to be used. This subject-matter is presented in my copending application for electric current supplying mechanism, Serial No. 859,095, filed August 28, 1914, as a division of this application.

What I claim is:—

1. In a winding mechanism, the combination of a reel, a motor, power transmitting means between the reel and the motor comprising two separate elements, one bodily movable with respect to the other, and a frictionally acting connecting element between them, a carrier for the movable power element, a starting device for the motor comprising a stationary element and a coöperating movable element connected rigidly to the said carrier, and a manually controllable lever for moving the carrier together with the connected starting device element and the movable power element to throw the starting device and power transmitting means into operation or to throw the starting device and power transmitting means out of operation.

2. In a winding mechanism, the combination of a reel, a motor mounted to swing bodily about a pivot, a sheave rigidly connected to the reel, a sheave mounted in bearings rigidly connected to the motor frame, an endless rope belt passing around the two sheaves, power transmitting gearing between the motor and the second sheave, a starting device for the motor comprising a stationary element and a movable element rigidly connected with the motor frame and adapted to engage the stationary element, and a lever connected to swing the motor and attached parts about the pivot to change the tension of the rope belt and to open or close the electrical connection through the starting device.

3. In a winding mechanism, the combination of a reel, a motor, power transmitting means between the reel and the motor comprising two separate elements, one bodily movable with respect to the other, and a frictionally acting connecting element between them, a carrier for the movable power element, a device for moving the carrier, a brake adapted to frictionally resist the rotation of the reel, and a connection between the carrier and the brake for automatically applying the brake when the movable power element is moved to break the power connection.

4. In a winding mechanism, the combination of a reel, a motor mounted to swing bodily about a pivot, a sheave rigidly connected to the reel, a sheave mounted in bearings rigidly connected to the motor frame, an endless rope belt passing around the two sheaves, power transmitting gearing between the motor and the second sheave, a device for moving the motor and attached parts about the pivot to change the tension of the rope belt, a brake adapted to frictionally resist the rotation of the reel, and a connection between the movable motor frame and the brake for automatically applying the brake when the second sheave is moved to release the tension in the rope belt.

5. In a winding mechanism, the combination of a rotatable reel, an electric motor, power transmitting means between the motor and the reel comprising a power element movable to make or break power connection, a movable carrier for the element, a starting device for the motor comprising a stationary element and a movable element rigidly mounted on the said movable carrier and adapted to engage the stationary element, a brake for the reel, and an operating connection between the carrier and the brake, the brake connection and the starting device being so constructed and arranged that movement of the carrier in the direction to operatively connect the motor and the reel will release the brake and make electrical connection to the motor through the starting device, and that movement of the carrier in the direction to disconnect the motor and the reel will apply the brake, and break the electrical connection to the motor through the starting box.

6. In a winding mechanism, the combination of a reel, a motor mounted to swing bodily about a pivot, a sheave rigidly connected to the reel, a second sheave mounted in bearings rigidly connected to the motor frame, an endless rope belt passing around the two sheaves, power transmitting gearing between the motor and the second sheave, a starting device for the motor comprising a stationary element and a movable element rigidly connected with the motor frame and adapted to engage the stationary element, a lever connected to swing the motor about its pivot, a brake for the reel, and a resilient connection between the movable motor framework and the brake for applying the brake whenever the motor casing is moved in the direction to release the tension of the rope belt and to break the electrical connection through the starting device to the motor.

7. In a winding mechanism, the combination of a reel, a motor mounted to move bodily, a sheave rigidly connected to the reel, a sheave mounted in bearings rigidly connected to the motor frame, an endless rope belt passing around the two sheaves, power transmitting gearing between the motor and the second sheave, a starting device for the motor comprising a stationary element and a movable element rigidly connected with the motor frame and adapted to engage the stationary element, and a lever connected to bodily move the motor and attached parts to change the tension of the rope belt and to open or close the electrical connection through the starting device.

8. In a winding mechanism, the combination of a reel, a motor mounted to move bodily, a sheave rigidly connected to the reel, a sheave mounted in bearings rigidly connected to the motor frame, an endless rope belt passing around the two sheaves, power transmitting gearing between the motor and the second sheave, a device for bodily moving the motor and attached parts to change the tension of the rope belt, a brake adapted to frictionally resist the rotation of the reel, and a connection between the movable motor frame and the brake for automatically applying the brake when the second sheave is moved to release the tension in the rope belt.

9. In a winding mechanism, the combination of a reel, a motor mounted to move bodily, a sheave rigidly connected to the reel, a second sheave mounted in bearings rigidly connected to the motor frame, an endless rope belt passing around the two sheaves, power transmitting gearing between the motor and the second sheave, a starting device for the motor comprising a stationary element and a movable element rigidly connected with the motor frame and adapted to engage the stationary element, a lever connected to bodily move the motor, a brake for the reel, and a connection between the movable motor framework and the brake for applying the brake whenever the motor casing is moved in the direction to release the tension of the rope belt and to break the electrical connection through the starting device to the motor.

In testimony whereof I affix my signature, in presence of two witnesses.

NILS D. LEVIN.

Witnesses:
ARTHUR G. SKEELS,
ROBERT R. DUNLOP.